(12) United States Patent
Park

(10) Patent No.: US 8,749,916 B2
(45) Date of Patent: Jun. 10, 2014

(54) MOTOR HAVING OIL STORAGE PART AND RECORDING DISK DRIVING DEVICE HAVING THE SAME

(75) Inventor: Young Ha Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 5 days.

(21) Appl. No.: 13/475,387

(22) Filed: May 18, 2012

(65) Prior Publication Data

US 2012/0300346 A1 Nov. 29, 2012

(30) Foreign Application Priority Data

May 23, 2011 (KR) .................. 10-2011-0048490

(51) Int. Cl.
*G11B 19/20* (2006.01)
*G11B 25/04* (2006.01)
*H02K 7/08* (2006.01)

(52) U.S. Cl.
USPC .................. 360/99.08; 310/67 R; 310/90

(58) Field of Classification Search
USPC ......... 360/99.08, 98.07, 99.04; 310/90, 67 R; 384/100–124
See application file for complete search history.

(56) References Cited

U.S. PATENT DOCUMENTS

| | | | |
|---|---|---|---|
| 2001/0022869 A1* | 9/2001 | Tanaka et al. .................. | 384/107 |
| 2002/0025090 A1* | 2/2002 | Sakatani et al. ............... | 384/107 |

FOREIGN PATENT DOCUMENTS

| | | |
|---|---|---|
| KR | 10-0601799 | 7/2006 |
| KR | 10-2006-0086613 | 8/2006 |

* cited by examiner

*Primary Examiner* — Craig A. Renner

(57) ABSTRACT

There is provided a motor including: a rotating member rotating together with a shaft and including an extension part extended along an outer surface of the shaft; a fixed member including a shaft support part supporting the shaft and an extension part support part supporting the extension part; and an oil storage part disposed between a lower surface of the extension part and the fixed member to thereby provide an oil storage space.

9 Claims, 8 Drawing Sheets

MOTOR HAVING OIL STORAGE PART AND RECORDING DISK DRIVING DEVICE HAVING THE SAME

CROSS-REFERENCE TO RELATED APPLICATIONS

This application claims the priority of Korean Patent Application No. 10-2011-0048490 filed on May 23, 2011, in the Korean Intellectual Property Office, the disclosure of which is incorporated herein by reference.

BACKGROUND OF THE INVENTION

1. Field of the Invention

The present invention relates to a motor and a recording disk driving device having the same, and more particularly, to a motor in which vibration characteristics are improved by increasing the strength of a fluid dynamic pressure bearing, and a recording disk driving device having the same.

2. Description of the Related Art

A hard disk drive (HDD), one of various information storage devices, reads data stored in a disk or writes data to the disk using a read/write head.

The hard disk drive requires a disk driving device capable of driving the disk. As the disk driving device, a small-sized motor is used.

In the small-sized motor, a fluid dynamic pressure bearing assembly has been used. A shaft, a rotating member of the fluid dynamic pressure bearing assembly, and a sleeve, a fixed member thereof include oil interposed therebetween, such that the shaft is supported by fluid pressure generated by the oil.

That is, in the motor, the oil is provided in a micro clearance between the sleeve and the shaft, and the fluid pressure supporting the shaft is generated by a dynamic pressure groove formed in the sleeve or the shaft.

Here, the center of gravity of the motor is generally positioned at an upper portion thereof, and fluid pressure from a dynamic pressure groove positioned at the upper portion of the motor is an important factor in determining the rotational characteristics of the motor.

However, in the case of the motor according to the related art, the fluid dynamic pressure supporting a shaft is the same at an upper portion and a lower portion of the shaft, such that a problem is generated in view of stable rotational characteristics. Therefore, vibrations are generated at the time of rotation of a rotating member, such that the performance of the motor may be inefficient.

In addition, when the rotating member of the motor rotates, a majority of the overall friction is caused by friction in a position in which the dynamic pressure groove is formed and power consumption for driving the motor is inevitably increased due to the friction.

In addition, when the amount of oil is reduced as compared to a normal level of oil due to various causes such as oil evaporation, oil leakage, and the like, the introduction of air bubbles from the outside and the friction between the rotating member and the fixed member further increase, such that it is difficult to secure floating force for rotation, thereby deteriorating the rotational characteristics of the rotating member.

Therefore, in the motor, research into technology for reducing friction, minimizing power consumption in the driving of the motor, securing a storage space for the oil, and implementing stable rotational characteristics has been urgently demanded.

SUMMARY OF THE INVENTION

An aspect of the present invention provides a motor in which an oil storage space is secured to thereby prevent a deterioration in the performance of the motor due to oil evaporation and leakage and friction between a shaft and a sleeve is minimized to thereby reduce power consumption and secure more stable driving performance, and a recording disk driving device having the same.

According to an aspect of the present invention, there is provided a motor including: a rotating member rotating together with a shaft and including an extension part extended along an outer surface of the shaft; a fixed member including a shaft support part supporting the shaft and an extension part support part supporting the extension part; and an oil storage part disposed between a lower surface of the extension part and the fixed member to thereby provide an oil storage space.

The oil storage part may have a vertical interval larger than a clearance between an outer surface of the extension part and the extension part support part and a clearance between the outer surface of the shaft and the shaft support part.

The oil storage part may be formed continuously or discontinuously along a circumference of one surface of the fixed member corresponding to the lower surface of the extension part.

At least one of the lower surface of the extension part and one surface of the fixed member that form the oil storage part may be inclined to thereby secure the oil storage space.

At least one of the shaft support part and the shaft and at least one of the extension part support part and the extension part may include a radial dynamic pressure part formed thereon to thereby provide radial dynamic pressure to the shaft and the extension part.

At least one of an upper surface of the fixed member and one surface of the rotating member corresponding to the upper surface of the fixed member may include a pumping part formed thereon to thereby pump oil between the shaft and the fixed member.

The shaft and the rotating member may be integrally formed with each other.

The motor may further include a stopper coupled to a hollow formed in a lower portion of the shaft.

The hollow formed in the shaft may have a diameter smaller than an outer diameter of the stopper, such that a clearance between the shaft and the fixed member is adjusted at the time of coupling the stopper thereto.

According to another aspect of the present invention, there is provided a recording disk driving device including: the motor as described above rotating a recording disk; a head transfer part transferring a head detecting information stored on the recording disk mounted in the motor to the recording disk; and a housing receiving the motor and the head transfer part therein.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
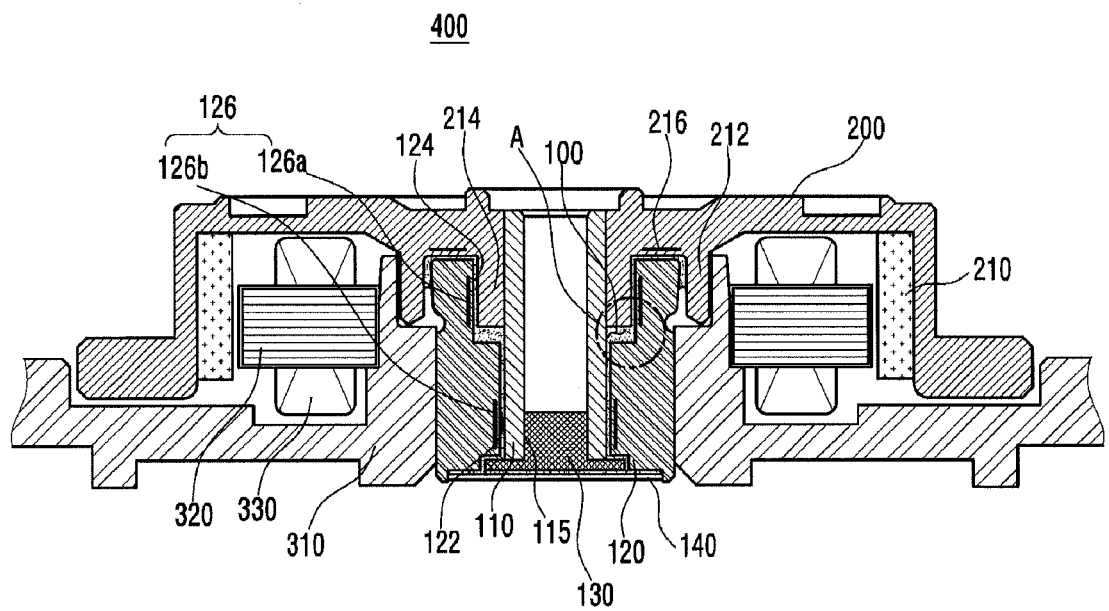
FIG. 1 is a cross-sectional view schematically showing a motor according to an embodiment of the present invention.

Embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, but those are to be construed as being included in the spirit of the present invention.

Further, like reference numerals will be used to designate like components having similar functions throughout the drawings within the scope of the present invention.

Figure 2A:
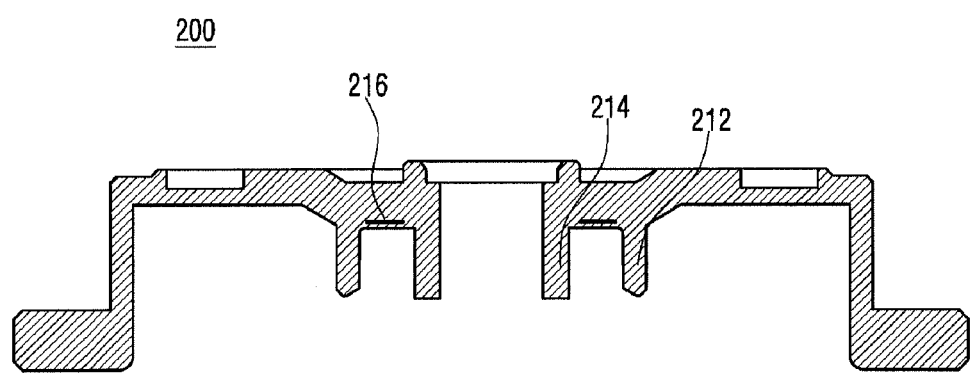
FIGS. 2A and 2B are, respectively, a cross-sectional view and a cut-away perspective view schematically showing a hub provided in a motor according to an embodiment of the present invention.
Figure 2B:
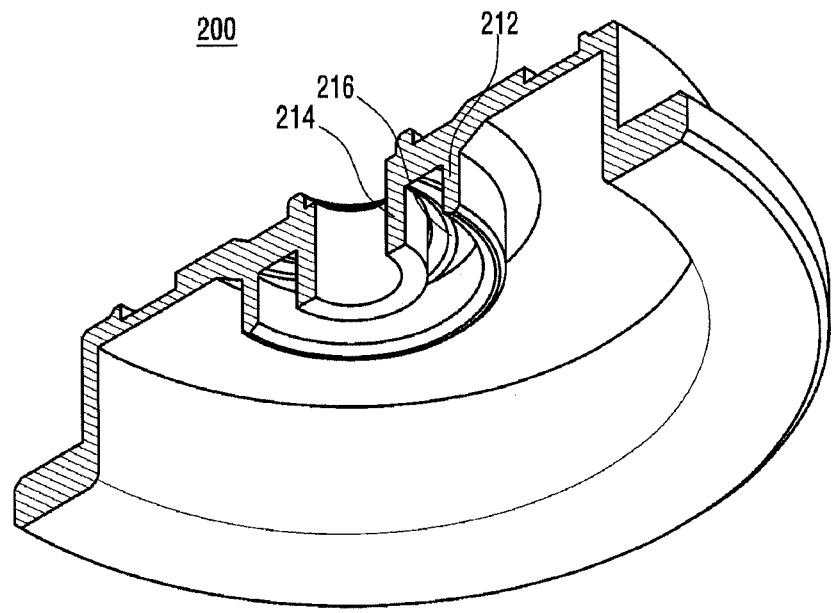
Figure 3A:
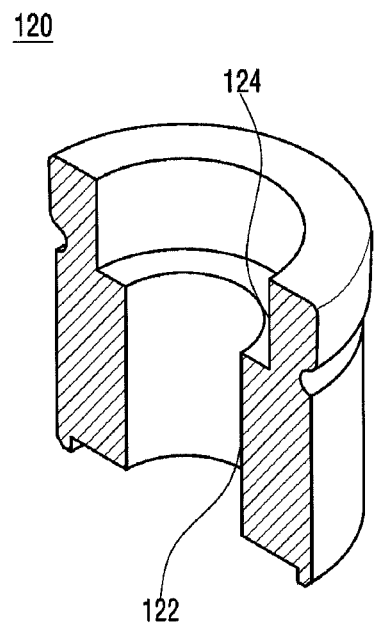
FIGS. 3A and 3B are, respectively, a cut-away perspective view and a cross-sectional view schematically showing a sleeve provided in a motor according to an embodiment of the present invention.
Figure 3B:
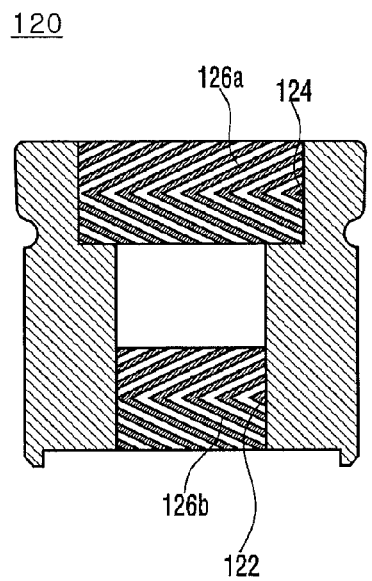

FIG. 1 is a cross-sectional view schematically showing a motor according to an embodiment of the present invention; FIGS. 2A and 2B are, respectively, a cross-sectional view and a cut-away perspective view schematically showing a hub provided in a motor according to an embodiment of the present invention; and FIGS. 3A and 3B are, respectively, a cut-away perspective view and a cross-sectional view schematically showing a sleeve provided in a motor according to an embodiment of the present invention.

Referring to FIGS. 1 through 3B, a motor 400 according to an embodiment of the present invention may include a shaft 110, a hub 200, a sleeve 120, a base member 310, and an oil storage part 100.

Terms with respect to directions will be first defined. As viewed in FIG. 1, an axial direction refers to a vertical direction based on the shaft 110, and an outer diameter or inner diameter direction refers to a direction towards an outer edge of the hub 200 based on the shaft 110 or a direction towards the center of the shaft 110 based on the outer edge of the hub 200.

The shaft 110, which is a rotating member coupled to the rotating hub 200 to thereby rotate together with the hub 200, may include a hollow 115 formed in a lower portion thereof.

The hollow 115 may include a stopper 130 to be described below coupled thereto, and have an inner diameter smaller than an outer diameter of the stopper 130.

This is to allow a clearance between the shaft 110 and the sleeve 120 to be adjusted using a deformation amount of the shaft 110 generated by the stopper 130 at the time of coupling of the stopper 130, that is, coupling of the stopper 130 to the shaft 110 in a forced fitting scheme, to be described below.

Here, the stopper 130, which is a component for preventing a rotating member including the shaft 110 from being excessively floated at the time of driving of the motor 400, may include a thrust dynamic pressure part formed therein, the thrust dynamic pressure part generating thrust dynamic pressure.

The hub 200 may be a rotating structure rotatably provided with respect to the base member 310 to be described below and include an annular ring-shaped magnet 210 formed on an inner circumference surface thereof, and the annular ring-shaped magnet 210 corresponds to a core 320 to be described below, having a predetermined interval therebetween.

In addition, the hub 200 may allow oil to be sealed between the hub 200 and an upper outer surface of the sleeve 120, and may include a main wall part 212 extended downwardly in the axial direction so that the oil is sealed.

That is, the main wall part 212 may protrude from one surface of the rotating hub 200 to thereby allow the oil to be sealed between the main wall part 212 and the fixed sleeve 120 and may be extended along the outer surface of the sleeve 120 so that an interface of the oil is formed between the main wall part 212 and the upper outer surface of the sleeve 120.

In addition, the hub 200, which is the rotating member, may include an extension part 214 extended downwardly in the axial direction along an outer surface of the shaft 110, and be stably fixed to the shaft 110 through coupling between an inner peripheral surface of the extension part 214 and an outer peripheral surface of the shaft 110.

Here, it is noted that the extension part 214 may be continuously formed in a circumferential direction so as to enclose the outer peripheral surface of the shaft 110, and there is no limitation in the length and thickness of the extension part protruding downwardly in the axial direction.

The extension part 214 protrudes downwardly in the axial direction, whereby a coupling area between the shaft 110 and the hub 200 may be increased. Even in the case that the motor 400 according to an embodiment of the present invention is designed to be small and slim, the strength of a coupling structure between the shaft 110 and the hub 200 may be increased.

In addition, the extension part 214 and the sleeve 120 may include the oil storage part 100 formed therebetween. A description of the oil storage part 100 will be provided below.

The sleeve 120 may be a fixed member, which is coupled to the base member 310 having the core 320 to be described below inserted thereinto and fixed thereto to thereby support a rotating member including the shaft 110 and the hub 200.

That is, the sleeve 120 may include a shaft support part 122 supporting the shaft 110 while forming a clearance between the shaft support part 122 and the shaft 110 and an extension part support part 124 supporting the extension part 214 while forming a clearance between the extension part support part 124 and the extension part 214 formed in the hub 200.

In other words, an inner peripheral surface of the sleeve 120 may correspond to outer peripheral surfaces of the shaft 110 and the extension part 214, and the extension part support part 124 may have a diameter larger than that of the shaft support part 122 by a thickness of the extension part 214.

Here, the clearance between the extension part 214 and the extension part support part 124 and the clearance between the shaft 110 and the shaft support part 122 may be equal and may be adjusted by the hollow 115 formed in the shaft 110.

That is, when the sleeve 120 and the shaft 110 having the hub 200 coupled thereto are coupled to each other, they are coupled to each other while adjusting a clearance between the extension part 214 and the sleeve 120, and the stopper 130 is then coupled to the hollow 115 formed in the shaft 110 in the forced fitting scheme, whereby the clearance between the shaft 110 and the shaft support part 122 may be adjusted using a deformation degree of the shaft 110.

Here, the sleeve 120 may be formed by forging Cu or Al or sintering Cu—Fe-based alloy powder or SUS-based powder and include a radial dynamic pressure part 126.

In other words, at least one of the shaft support part 122 and the shaft 110 supported by the shaft support part 122 and at least one of the extension part support part 124 and the extension part 214 supported by the extension part support part 124 may include the radial dynamic pressure part 126 providing radial dynamic pressure to the shaft 110 and the extension part 214.

Here, the radial dynamic pressure part 126 may be divided into an upper radial dynamic pressure part 126*a* and a lower radial dynamic pressure part 126*b*. In the motor 400 according to the embodiment of the present invention, the upper radial dynamic pressure part 126*a* may have a diameter greater than that of the lower radial dynamic pressure part 126*b*.

Therefore, it means that radial dynamic pressure generated by the upper radial dynamic pressure part 126*a* may be greater than radial dynamic pressure generated by the lower radial dynamic pressure part 126*b* under the same conditions.

Here, since the center of gravity of the motor 400 according to the embodiment of the present invention is positioned in an upper portion thereof, the larger the radial dynamic pressure generated at the upper portion thereof is, the less the vibrations generated at the time of rotation of the motor 400 may be. Therefore, resistance to external impacts, or the like, may be maximally secured.

In addition, since the upper radial dynamic pressure part 126*a* has the diameter larger than that of the lower radial dynamic pressure part 126*b*, even if a vertical length of the upper radial dynamic pressure part 126*a* is reduced, sufficient radial dynamic pressure may be secured. Therefore, friction due to the upper radial dynamic pressure part 126*a* generated at the time of the rotation of the motor 400 may be reduced, whereby power consumption for driving of the motor 400 may be minimized.

Here, the radial dynamic pressure part 126 may have at least one of a herringbone shape, a spiral shape, and a helical shape. However, the radial dynamic pressure part 126 is not limited to having the above-mentioned shape but may have any shape as long as radial dynamic pressure may be generated.

In addition, at least one of the upper surface of the sleeve 120, which is the fixed member, and the surface of the hub 200 corresponding to the upper surface of the sleeve 120 may include a pumping part 216 formed thereon to thereby pump the oil between the shaft 110 and the sleeve 120.

The pumping part 216 may also provide thrust dynamic pressure to the motor 400 according to the embodiment of the present invention and may have a spiral shape as shown in FIG. 2. However, the shape of the pumping part 216 is not limited thereto.

In this configuration, a cover plate 140 may be coupled to a lower portion of the sleeve 120 in the axial direction, having a clearance therebetween, and the clearance receives the oil.

The cover plate 140 may receive the oil in the clearance between the cover plate 140 and the sleeve 120 to thereby serve as a bearing supporting a lower surface of the shaft 110.

In addition, the oil may be continuously filled in the clearance between the shaft 110 and the sleeve 120, in the clearance between the hub 200 and the sleeve 120 and in the clearance between the cover plate 140, the shaft 110 and the sleeve 120 to thereby entirely form a full-fill structure.

The base member 310 having an insertion hole formed therein may be a fixed structure including a coil 330 generating electromagnetic force having a predetermined magnitude when power is applied thereto and the core 320 having the coil 330 wound therearound.

The core 320 is fixedly disposed on an upper surface of the base member 310 including a printed circuit board (not shown) having circuit patterns printed thereon, a plurality of coil holes having a predetermined size are formed to penetrate through the base member 320 so as to expose the coil 330 downwardly in the upper surface of the base member 310 corresponding to the coil 330, and the coil 330 may be electrically connected to the printed circuit board so that external power is supplied thereto.

The base member 310 may be fixed to the outer peripheral surface of the sleeve 120 and the core 320 having the coil 330 wound therearound may be inserted into the base member 310. Here, they may be assembled by applying an adhesive to an inner surface of the base member 310 or the outer surface of the sleeve 120.

The oil storage part 100 is a component formed between a lower surface of the hub 200 and the sleeve 120 to secure an oil storage space. The lower surface of the hub 200 and the upper surface of the sleeve 120 may become a boundary of the oil storage part 100.

In this configuration, the oil storage part 100 may have a vertical interval larger than the clearance between the outer surface of the extension part 214 and the extension part support part 124 and the clearance between the outer surface of the shaft 110 and the shaft support part 122.

However, the vertical interval of the oil storage part 100 is not limited but may be variously modified as long as a space capable of storing the oil may be provided therein.

In addition, the oil storage part 100 may be formed continuously or discontinuously along a circumference of one surface of the sleeve 120 corresponding to a lower surface of the extension part 214.

That is, the oil storage part 100 may be elongated in the inner diameter direction and be extended up to the inner peripheral surface of the sleeve 120.

However, the oil storage part may also be formed by depressing one surface of the sleeve 120 corresponding to the lower surface of the extension part 214. In this case, the depressed portion may have a doughnut shape.

In this configuration, the oil storage part 100 maximizes oil storage capability, whereby the leakage of oil due to external impacts or volume expansion of the oil, or the like, in the case in which a temperature rises at the time of driving the motor 400 according to the embodiment of the present invention may be prevented.

Therefore, the oil storage part 100 may secure reliability in terms of the evaporation and leakage of oil.

In addition, the oil storage part 100 is an area that is almost non-affected by friction at the time of rotation of the motor 400 according to the embodiment of the present invention. Therefore, due to the oil storage part 100, the vertical length of the upper radial dynamic pressure part 126*a* may be reduced as described above, whereby the power consumption for driving of the motor 400 may be minimized.

Here, since the upper radial dynamic pressure part 126*a* may have a diameter larger than that of the lower radial dynamic pressure part 126*b*, there is no problem in generating sufficient dynamic pressure.

Figure 4:
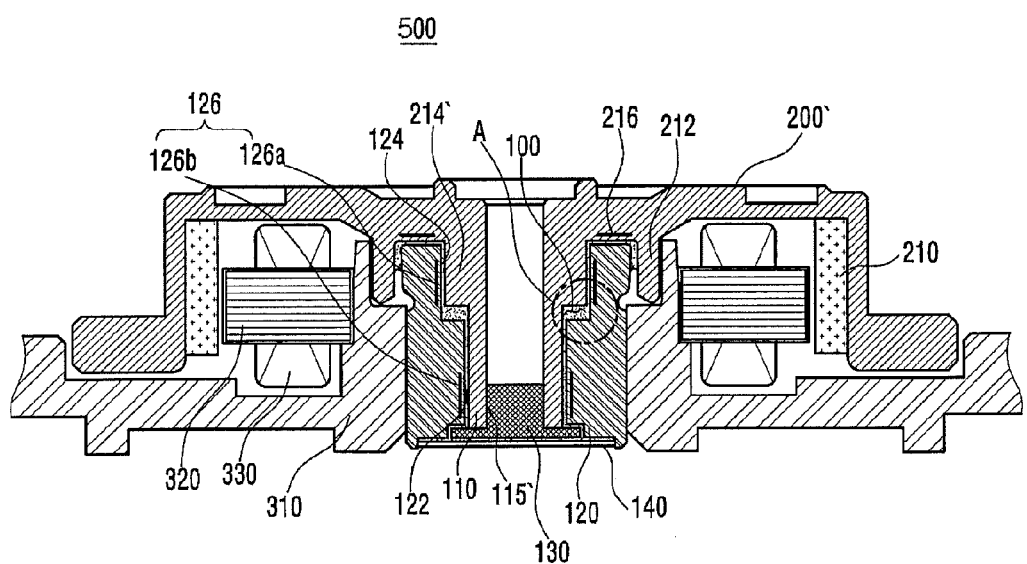
FIG. 4 is a cross-sectional view schematically showing a motor according to another embodiment of the present invention.
Figure 5A:
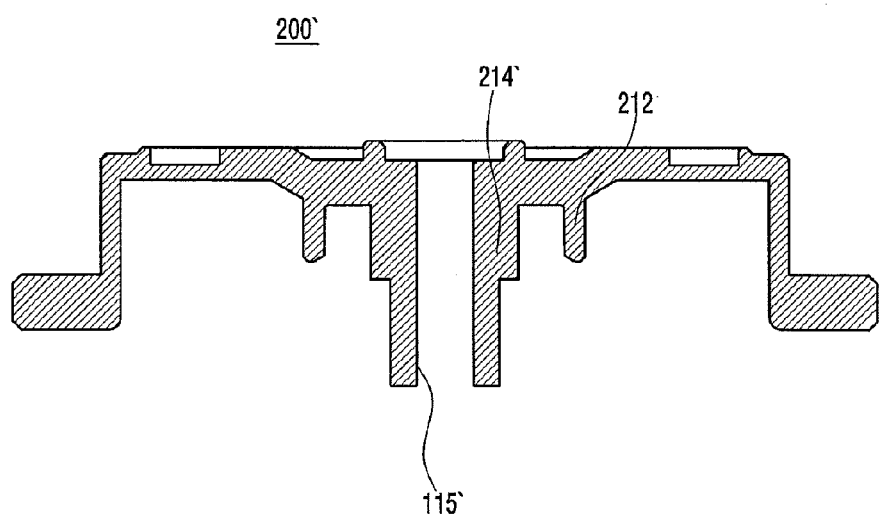
FIGS. 5A and 5B are, respectively, a cross-sectional view and a cut-away perspective view schematically showing a hub provided in a motor according to another embodiment of the present invention.
Figure 5B:
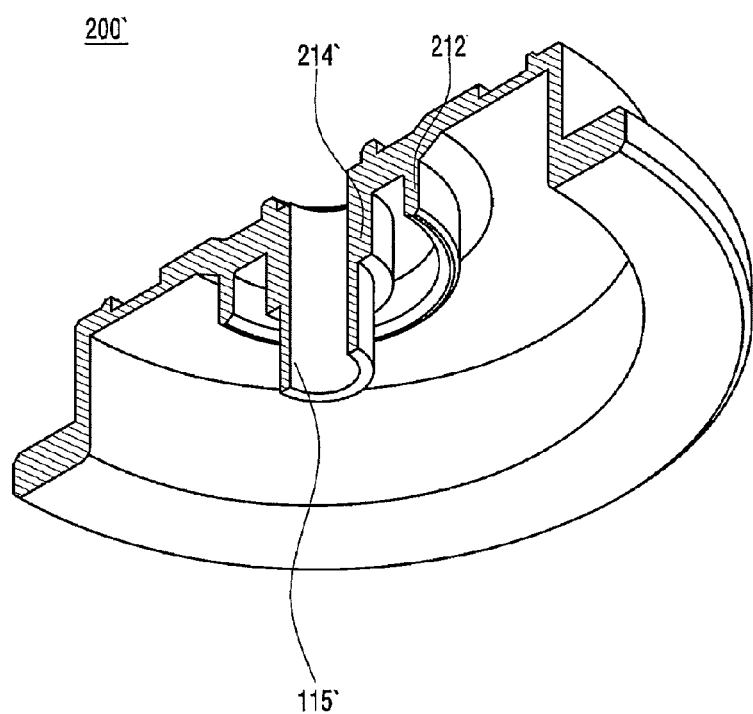

FIG. 4 is a cross-sectional view schematically showing a motor according to another embodiment of the present invention; and FIGS. 5A and 5B are, respectively, a cross-sectional view and a cut-away perspective view schematically showing a hub provided in the motor according to another embodiment of the present invention.

FIGS. 4 and 5B, a motor 500 according to another embodiment of the present invention may have the same configuration and effect as those of the motor 400 according to the previous embodiment of the present invention except for a hub 200'. Therefore, a description except for the hub 200' will be omitted.

When the present embodiment is compared to the above-mentioned embodiment, the hub 200' may have a structure 214' in which the shaft 110 and the hub 200 according to the above-mentioned embodiment are integrally formed with each other and may include a hollow 115' formed in a lower portion thereof.

The hollow 115' may have the stopper 130 coupled thereto, and a clearance between a lower end of the hub 200' and the sleeve 120 may be adjusted by a forced fitting scheme of the stopper 130.

Figure 6:
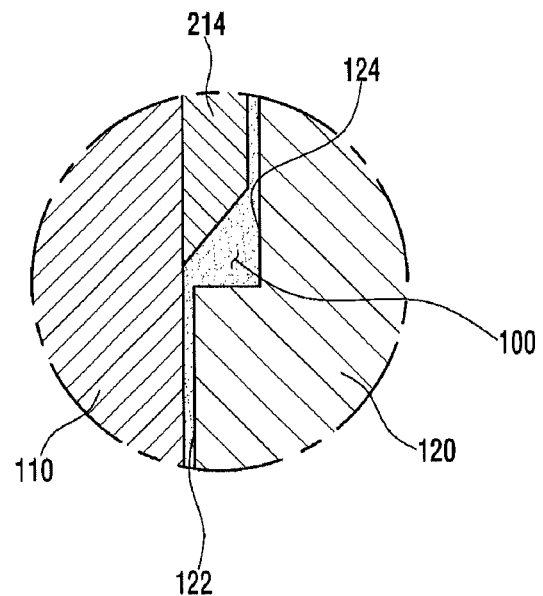
FIGS. 6 through 8 are enlarged views schematically showing a modified example of part A of FIG. 1.
Figure 7:
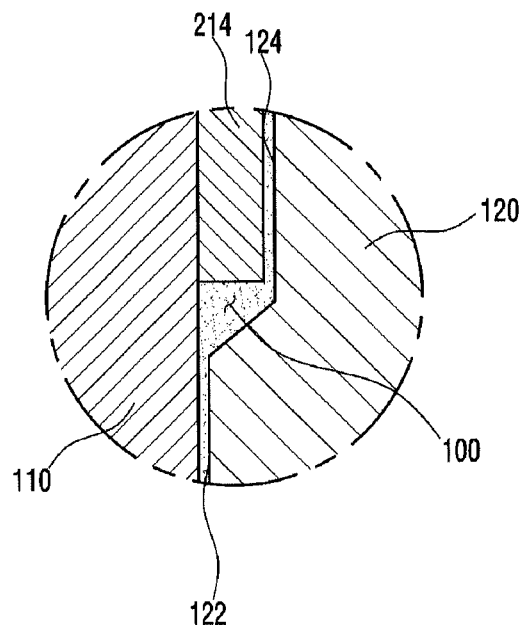
Figure 8:
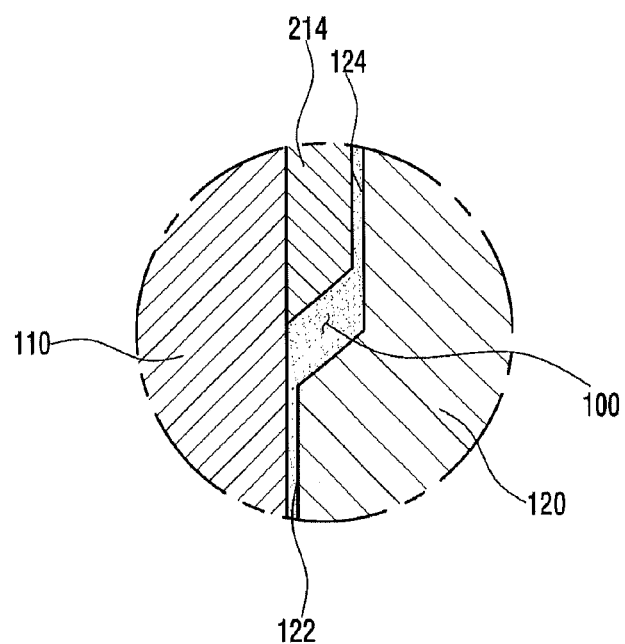

FIGS. 6 through 8 are enlarged views schematically showing a modified example of part A of FIG. 1.

Referring to FIGS. 6 through 8, at least one of the lower surface of the extension part 214 and one surface of the sleeve 120 that form the oil storage part 100 is inclined, whereby an oil storage space may be secured.

That is, the lower surface of the extension part 214 may be inclined upwardly in the axial direction based on the inner surface of the extension part 214, and one surface of the sleeve 120 corresponding to the lower surface of the extension part 214 may also be inclined, similar to the lower surface of the extension part 214.

Figure 9:
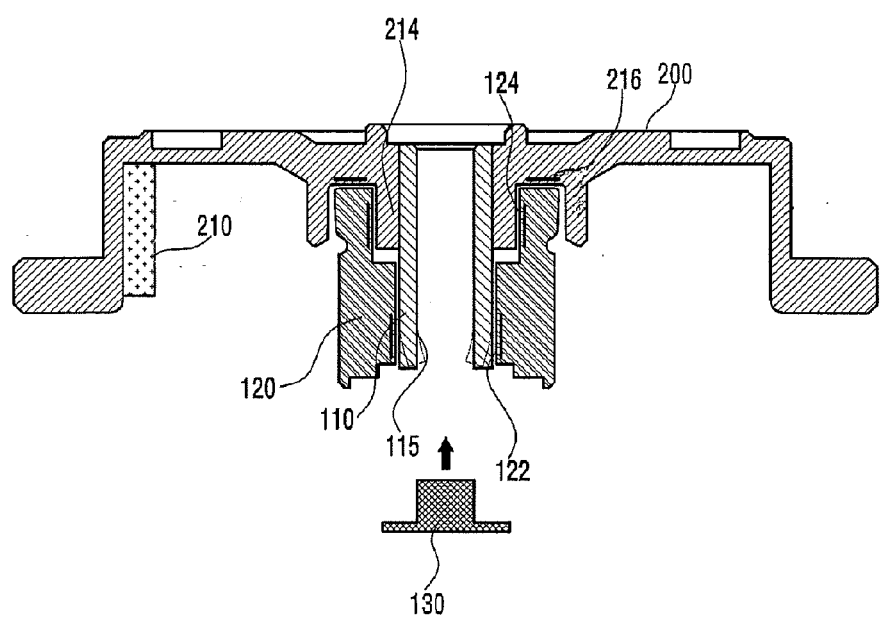
FIG. 9 is a cross-sectional view schematically showing a case in which a clearance between a shaft and a sleeve is adjusted when a stopper provided in a motor according to an embodiment of the present invention is coupled to the shaft.

FIG. 9 is a cross-sectional view schematically showing a case in which a clearance between a shaft and a sleeve is adjusted when a stopper provided in a motor according to an embodiment of the present invention is coupled to the shaft.

Referring to FIG. 9, when the sleeve 120 and the shaft 110 having the hub 200 coupled thereto are coupled to each other, they may be coupled to each other while adjusting a clearance between the extension part 214 and the sleeve 120.

Here, a clearance between the shaft 110 and the shaft support part 122 of the sleeve 120 may be larger than a clearance between the extension part 214 and the extension part support part 124.

However, since the hollow 115 formed in the shaft 110 has a diameter smaller than that of the stopper 130, when the stopper 130 is coupled to the hollow 115 in the forced fitting scheme, the shaft 110 may be deformed in the outer diameter direction by the stopper 130.

Therefore, since the clearance between the shaft 110 and the shaft support part 122 may become smaller than the clearance therebetween before the stopper 130 is coupled to the hollow 115, a deformation amount of the shaft 110 is controlled, whereby the clearance may be optimized.

Figure 10:
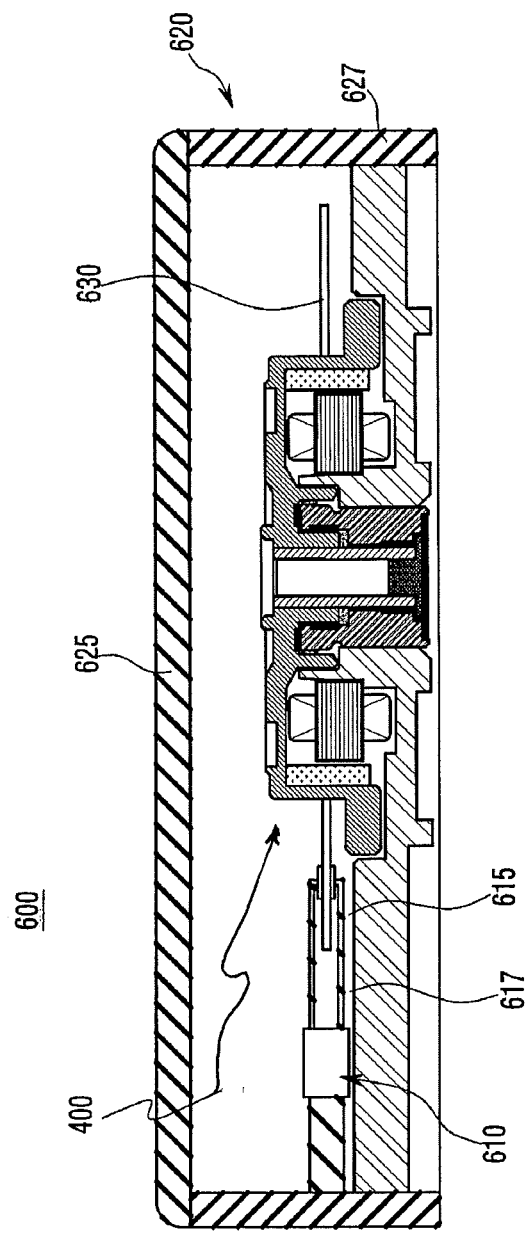
FIG. 10 is a cross-sectional view schematically showing a recording disk driving device according to another embodiment of the present invention.

FIG. 10 is a cross-sectional view schematically showing a recording disk driving device according to another embodiment of the present invention.

Referring to FIG. 10, a recording disk driving device 600 including the motor 400 according to the embodiment of the present invention mounted therein may be a hard disk driving device and include the motor 400, a head transfer part 610, and a housing 620.

The motor 400 may have all of the characteristics of the motor according to embodiments of the present invention described above and include a recording disk 630 mounted therein.

Although the motor 400 according to the embodiment of the present invention is employed as shown in FIG. 10, the present invention is not limited thereto. The motor may be any motor as long as it may rotate a disk.

The head transfer part 610 may transfer a head 615 detecting information stored on the recording disk 630 mounted in the motor 400 to a surface of the recording disk to be detected.

Here, the head 615 is disposed on a support portion 617 of the head transfer part 610.

The housing 620 may include a plate 627 having the motor mounted thereon and a top cover 625 shielding an upper portion of the plate 627 having the motor mounted thereon in order to form an internal space receiving the motor 400 and the head transfer part 610.

Through the embodiments of the invention as described above, the motors 400 and 500 and the recording disk driving device 600 may secure the oil storage space due to the oil storage part 100, whereby the leakage of the oil due to external impacts, or volume expansion of the oil in the case in which a temperature rises at the time of the driving of the motors 400 and 500 may be prevented.

In addition, the vertical length of the upper radial dynamic pressure part 126a may be reduced due to the oil storage part 100 while maintaining strength by securing sufficient radial dynamic pressure, whereby power consumption for driving the motors 400 and 500 may be minimized.

As set forth above, in a motor and a recording disk driving device including the same according to embodiments of the present invention, fluid dynamic pressure in an upper portion of a shaft is improved, whereby strength may be maximized. In addition, friction between the shaft and a sleeve is minimized, whereby power consumption for driving of the motor may be minimized.

Further, an oil storage space is secured, whereby stable driving performance may be secured.

While the present invention has been shown and described in connection with the embodiments, it will be apparent to those skilled in the art that modifications and variations can be made without departing from the spirit and scope of the invention as defined by the appended claims.

What is claimed is:

1. A motor comprising:
   a rotating member rotating together with a shaft and including an extension part extended along an outer surface of the shaft;
   a fixed member including a shaft support part supporting the shaft and an extension part support part supporting the extension part; and
   an oil storage part disposed between a lower surface of the extension part and the fixed member to thereby provide an oil storage space, the oil storage part having a vertical interval larger than a clearance between an outer surface of the extension part and the extension part support part and a clearance between the outer surface of the shaft and the shaft support part.

2. The motor of claim 1, wherein the oil storage part is formed continuously or discontinuously along a circumference of one surface of the fixed member corresponding to the lower surface of the extension part.

3. The motor of claim 1, wherein at least one of the lower surface of the extension part and one surface of the fixed member that form the oil storage part is inclined to thereby secure the oil storage space.

4. The motor of claim 1, wherein at least one of the shaft support part and the shaft and at least one of the extension part support part and the extension part include a radial dynamic pressure part formed thereon to thereby provide radial dynamic pressure to the shaft and the extension part.

5. The motor of claim 1, wherein at least one of an upper surface of the fixed member and one surface of the rotating member corresponding to the upper surface of the fixed member includes a pumping part formed thereon to thereby pump oil between the shaft and the fixed member.

6. The motor of claim 1, wherein the shaft and the rotating member are integrally formed with each other.

7. The motor of claim 1, further comprising a stopper coupled to a hollow formed in a lower portion of the shaft.

8. The motor of claim 7, wherein the hollow has a diameter smaller than an outer diameter of the stopper, such that a clearance between the shaft and the fixed member is adjusted at the time of coupling the stopper thereto.

9. A recording disk driving device comprising:
   the motor of claim 1 rotating a recording disk;
   a head transfer part transferring a head detecting information stored on the recording disk mounted in the motor to the recording disk; and
   a housing receiving the motor and the head transfer part therein.

* * * * *